（12）United States Patent
Yamazaki et al.

(10) Patent No.: US 10,661,539 B2
(45) Date of Patent: May 26, 2020

(54) HUMIDITY CONTROL CONTAINER

(71) Applicants: Atsuhiko Yamazaki, Tokyo (JP); Taro Enjoji, Tokyo (JP)

(72) Inventors: Atsuhiko Yamazaki, Tokyo (JP); Taro Enjoji, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 16/099,886

(22) PCT Filed: Apr. 10, 2017

(86) PCT No.: PCT/JP2017/014704
§ 371 (c)(1),
(2) Date: Nov. 8, 2018

(87) PCT Pub. No.: WO2017/203856
PCT Pub. Date: Nov. 30, 2017

(65) Prior Publication Data
US 2019/0152199 A1     May 23, 2019

(30) Foreign Application Priority Data

May 27, 2016  (JP) .................................. 2016-106725

(51) Int. Cl.
*B32B 27/08*       (2006.01)
*B32B 27/20*       (2006.01)
(Continued)

(52) U.S. Cl.
CPC .............. *B32B 27/08* (2013.01); *B32B 1/02* (2013.01); *B32B 27/00* (2013.01); *B32B 27/20* (2013.01);
(Continued)

(58) Field of Classification Search
CPC ......... B32B 27/08; B32B 27/32; B32B 27/20; B32B 27/00; B32B 1/02; B32B 2439/60;
(Continued)

(56) References Cited

U.S. PATENT DOCUMENTS 3,757,978 A  *  9/1973  Gilbert ................ B29C 49/4817
                                              215/371
4,079,850 A  *  3/1978  Suzuki .................... B29C 49/22
                                              215/12.2
(Continued)

FOREIGN PATENT DOCUMENTS

CN         104271453 A     1/2015
JP         H10-244581 A    9/1998
(Continued)

OTHER PUBLICATIONS

Jul. 4, 2017 International Search Report issued in International Patent Application No. PCT/JP2017/014704.
(Continued)

*Primary Examiner* — Chun Hoi Cheung
*Assistant Examiner* — Brijesh V. Patel
(74) *Attorney, Agent, or Firm* — Oliff PLC

(57) ABSTRACT

A synthetic resin humidity control container has a storing chamber that contains contents and a pinch-off portion on the bottom of the container, the wall of the container including an innermost layer that defines a storing chamber, an outermost layer that is disposed outside the innermost layer and moisture absorption layers that are disposed between the innermost layer and the outermost layer and contain a hygroscopic inorganic filler, the innermost layer being made of a material having an MFR of less than 2.0.

4 Claims, 2 Drawing Sheets

(51) Int. Cl.
  *B32B 27/32* (2006.01)
  *B65D 81/26* (2006.01)
  *B32B 27/00* (2006.01)
  *B65D 1/02* (2006.01)
  *B32B 1/02* (2006.01)

(52) U.S. Cl.
  CPC ............... *B32B 27/32* (2013.01); *B65D 1/02* (2013.01); *B65D 1/0215* (2013.01); *B65D 81/26* (2013.01); *B65D 81/266* (2013.01); *B32B 2250/05* (2013.01); *B32B 2250/242* (2013.01); *B32B 2307/724* (2013.01); *B32B 2439/60* (2013.01)

(58) Field of Classification Search
  CPC .......... B32B 2250/05; B32B 2250/242; B32B 2307/724; B65D 81/26; B65D 81/266; B65D 1/02; B65D 1/0215
  USPC .... 206/204, 524.1, 540, 528, 529, 534, 535, 206/530, 524.2, 524.4, 524.6, 254.9; 383/109
  See application file for complete search history.

(56) References Cited

U.S. PATENT DOCUMENTS

| | | | | |
|---|---|---|---|---|
| 4,174,783 A * | 11/1979 | Abe | ............... | B65D 1/0215 215/12.2 |
| 4,425,410 A * | 1/1984 | Farrell | ............... | B32B 27/18 428/516 |
| 4,567,069 A * | 1/1986 | Jabarin | ............... | B32B 33/00 206/524.3 |
| 4,919,984 A * | 4/1990 | Maruhashi | ............... | B29B 17/0005 428/36.4 |
| 4,977,004 A * | 12/1990 | Bettle, III | ............... | B32B 27/28 229/5.84 |
| 4,989,738 A * | 2/1991 | Thayer | ............... | B29C 49/22 215/373 |
| 6,991,095 B1 * | 1/2006 | Yamasoto | ............... | A61K 9/7053 206/204 |
| 8,061,540 B2 * | 11/2011 | Toyoda | ............... | B29C 49/0073 215/12.1 |
| 8,893,908 B2 * | 11/2014 | Treece | ............... | B29D 22/003 215/373 |
| 2007/0178266 A1 * | 8/2007 | Dey | ............... | B29C 49/0005 428/35.7 |
| 2008/0012172 A1 | 1/2008 | Merical et al. | | |
| 2008/0185301 A1 * | 8/2008 | Merical | ............... | B29C 49/0005 206/204 |
| 2012/0006697 A1 * | 1/2012 | Portier | ............... | B65D 23/02 206/204 |
| 2012/0088082 A1 * | 4/2012 | Friedman | ............... | B32B 17/10036 428/213 |
| 2015/0144523 A1 | 5/2015 | Hirose | | |
| 2016/0136864 A1 * | 5/2016 | Miyawaki | ............... | B65D 1/023 206/457 |
| 2016/0221292 A1 * | 8/2016 | Takeuchi | ............... | B32B 7/06 |

FOREIGN PATENT DOCUMENTS

| | | |
|---|---|---|
| JP | 2003-261158 A | 9/2003 |
| JP | 2003-261168 A | 9/2003 |
| JP | 2003-267431 A | 9/2003 |
| JP | 2004-196337 A | 7/2004 |
| JP | 2005-220149 A | 8/2005 |
| JP | 2011-246181 A | 12/2011 |

OTHER PUBLICATIONS

Apr. 23, 2019 Office Action issued in Chinese Patent Application No. 201780028698.X.
Nov. 27, 2018 International Preliminary Report on Patentability issued in International Patent Application No. PCT/JP2017/014704.
Sep. 23, 2019 Office Action issued in Chinese Patent Application No. 201780028698.X.
Nov. 12, 2019 Office Action issued in Japanese Patent Application No. 2016-106725.
Dec. 13, 2019 Extended European Search Report issued in European Patent Application No. 17802457.6.

* cited by examiner

HUMIDITY CONTROL CONTAINER

TECHNICAL FIELD

The present disclosure relates to a synthetic resin humidity control container.

BACKGROUND

Conventionally, as a container that contains a variety of contents, in order to protect the contents from moisture, a container that is sealed when the contents are contained in a storing chamber of the container and is opened when the contents are take out for use has been used. However, the contents may deteriorate due to moisture in the storing chamber in the period between the time when the contents are sealed inside the storing chamber of the container and the time when the container body is opened by the user. Thus, in PTL1, for example, a humidity control container including a moisture absorption layer that contains a hygroscopic inorganic filler (desiccant) on a wall of the container body has been proposed.

Further, PTL2 proposes a humidity control container in which a moisture absorption layer disposed between an innermost layer and an outermost layer is composed of a plurality of layers. Specifically, the moisture absorption layer disposed between the innermost layer and the outermost layer is composed of a first moisture absorption layer (a first resin composition layer) and a second moisture absorption layer (a second resin composition layer) disposed outside the first moisture absorption layer. When the humidity control container is configured in the above described manner, moisture from the outside air is absorbed by the second moisture absorption layer located outside and hardly reaches the first moisture absorption layer. Thus the moisture in the storing chamber can be intensively absorbed by the first moisture absorption layer, and the moisture absorbing performance in the storing chamber can be enhanced.

CITATION LIST

Patent Literature

PTL 1: JP2005220149A
PTL 2: JP2011246181A

SUMMARY

Technical Problem

Such a humidity control container can be formed, for example, by laminating a plurality of resins and coextruding them into a tubular shape to form a laminated parison, and blow molding the laminated parison by a blow molding mold. The blow molding mold is configured to be divided into two along a vertical single dividing surface, the entire surface of which including a central axis of the container, and to include a pinch-off portion (a portion provided with a pinch-off blade along the dividing surface) of the mold at the position that corresponds to the bottom of the container. Further, on the bottom of the container, which will be a product, a pinch-off portion (also referred to as a bottom seal portion) in an elongated protrusion shape is formed on a parting line that corresponds to the dividing surface of the mold by pinching off the laminated parison while crushing it into a flat shape by a pinch-off portion of the blow molding mold.

When a humidity control container including a moisture absorption layer between an innermost layer and an outermost layer as described above is formed by blow molding, the strength of the bottom decreases due to a decrease in the thickness of the pinch-off portion formed on the bottom of the container, and as a result, cracks easily occur on the bottom with the pinch-off portion as a starting point.

The present disclosure has been conceived in view of the above problem, and is to provide a humidity control container that includes a moisture absorption layer containing a hygroscopic inorganic filler between an innermost layer and an outermost layer and a pinch-off portion on the bottom of the container, and has an improved strength of the bottom.

Solution to Problem

The present disclosure is provided to solve the above described problem, and the humidity control container according to the present disclosure is a synthetic resin humidity control container that has a storing chamber in which contents are contained and a pinch-off portion on the bottom of the container, a wall of the container including:
an innermost layer that defines the storing chamber;
an outermost layer disposed outside the innermost layer; and
a moisture absorption layer that is disposed between the innermost layer and
the outermost layer and contains a hygroscopic inorganic filler, the innermost layer being formed of a material with an MFR of less than 2.0.

Preferably, in the disclosed humidity control container, the layer thickness of the pinch-off portion is 350 μm or more.

Preferably, in the disclosed humidity control container, the innermost layer is made of polyethylene.

Preferably, in the disclosed humidity control container, the layer thickness of the innermost layer of the pinch-off portion is 4% or more of the thickness of the wall.

Preferably, in the disclosed humidity control container, the moisture absorption layer has a first moisture absorption layer that contains calcium oxide and a second moisture absorption layer that is disposed outside the first moisture absorption layer and contains magnesium sulfate.

Preferably, in the disclosed humidity control container, an intermediate layer that contains no hygroscopic inorganic filler is disposed between the first moisture absorption layer and the second moisture absorption layer.

Advantageous Effect

According to the present disclosure, a humidity control container that includes a moisture absorption layer containing a hygroscopic inorganic filler between an innermost layer and an outermost layer and a pinch-off portion on the bottom of the container and has an improved strength of the bottom can be provided.

BRIEF DESCRIPTION OF THE DRAWINGS

In the accompanying drawings.

DETAILED DESCRIPTION

Figure 1:
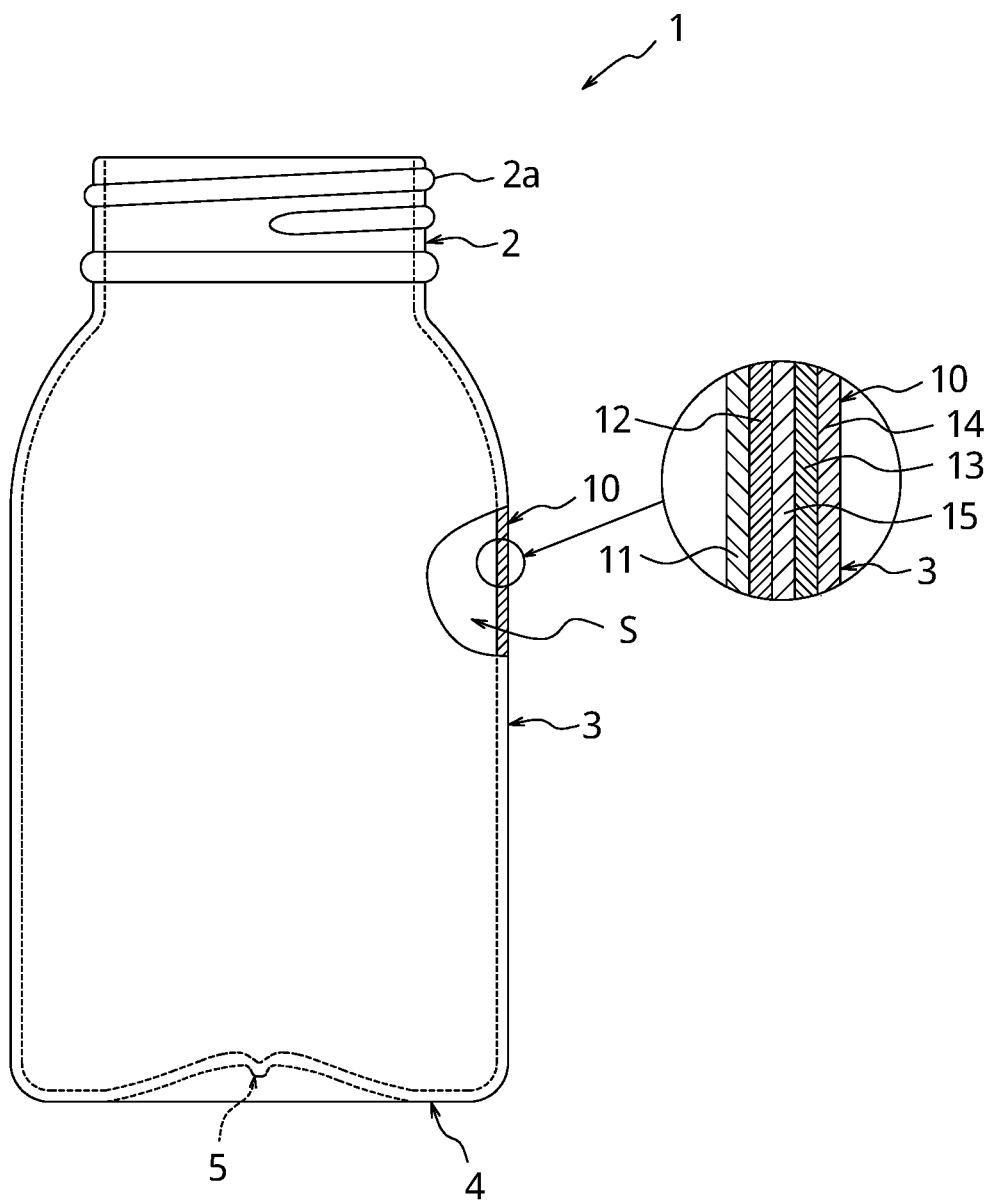
FIG. 1 is a side view of a humidity control container according to an embodiment of the present disclosure, a portion thereof being indicated in cross-section, and an enlarged view of the portion.

An embodiment according to the present disclosure will be described below with reference to drawings. A humidity control container 1 according to the present embodiment can be formed into a bottomed tubular shape having a mouth 2, a trunk 3 and a bottom 4 as illustrated in FIG. 1, for example. In the illustrated example, the mouth 2 is provided with a male screw 2a to allow for screwing a lid body (not illustrated), but not limited thereto. For example, the mouth 2 can be provided with a concave and convex to be engaged with the lid in an undercut manner so that it is mounted by capping or the like.

Further, the humidity control container 1 has a storing chamber S in which contents are contained. A wall 10 forming the mouth 2, the trunk 3 and the bottom 4 includes an innermost layer 11 that defines the storing chamber S; a first moisture absorption layer 12 that surrounds the innermost layer 11 from the opposite side of the storing chamber S; an intermediate layer 15 that surrounds the first moisture absorption layer 12 from the opposite side of the storing chamber S; a second moisture absorption layer 13 that surrounds the intermediate layer 15 from the opposite side of the storing chamber S; and an outermost layer 14 that surrounds the second moisture absorption layer 13 from the opposite side of the storing chamber S.

The innermost layer 11 and the outermost layer 14 are respectively made of olefin resin containing no hygroscopic inorganic filler (desiccant) such as polyethylene, polypropylene or cyclic olefin. Specific examples of polyethylene include linear low-density polyethylene resin (LLDPE), low-density polyethylene (LDPE), middle-density polyethylene (MDPE), high-density polyethylene (HDPE) or the like.

In this case, the innermost layer 11 is made of a material with an MFR (melt mass flow rate) of 2.0 (g/10 min) or less. The MFR can be measured by a method in accordance with JIS K 6922 for polyethylene resin (PE), by a method in accordance with JIS K6921 for polypropylene resin (PP), and a method in accordance with JIS K7210 for other cases.

The first moisture absorption layer 12 and the second moisture absorption layer 13 are respectively made of, for example, olefin resin mixed with hygroscopic inorganic filler (desiccant) such as polyethylene, polypropylene or cyclic olefin. Examples of the hygroscopic inorganic filler include, for example, one of or a mixture of two or more of calcium oxide, molecular sieve, magnesium sulfate, silica gel, calcium chloride and silica alumina gel.

Among them, the molecular sieve is a crystalline zeolite and is expressed by the following general formula (1);

$$M_{2/n}O \cdot Al_2O_3 \cdot xSiO_2 \cdot yH_2O \quad (1)$$

wherein M is a metal cation and n is an atomic value. It is to be noted that, as M, sodium or the like can be adopted, for example.

An example of the hygroscopic inorganic filler contained in the first moisture absorption layer 12 includes calcium oxide, for example, and an example of the hygroscopic inorganic filler contained in the second moisture absorption layer 13 includes magnesium sulfate, for example. In this example, the first moisture absorption layer 12 is mixed with calcium oxide in an amount of 60 wt %, and the second moisture absorption layer 13 is mixed with magnesium sulfate in an amount of 12 wt %. It is to be noted that the resin to which the hygroscopic inorganic filler is added may be any resin as far as it is olefin resin such as PP, PE (LDPE, LLDPE, MDPE, HDPR or the like), COC and COP. The resin may be appropriately chosen in consideration of property.

In the present embodiment, the intermediate layer 15 made of olefin resin containing no hygroscopic inorganic filler is disposed between the first moisture absorption layer 12 and the second moisture absorption layer 13. In the same manner as the innermost layer 11, the first moisture absorption layer 12, the second moisture absorption layer 13 and the outermost layer 14, the intermediate layer 15 is formed into a bottomed tubular shape. The intermediate layer 15 is thinner than each of the first moisture absorption layer 12 and the second moisture absorption layer 13. It is to be noted that the thickness of the intermediate layer 15 is from 30 μm to 100 μm, for example. Further, in the humidity control container 1 according to the present embodiment, the intermediate layer 15 is the thinnest, and the thickness increases in the order of the innermost layer 11, the outermost layer 14 and the first moisture absorption layer 12. The second moisture absorption layer 13 is the thickest.

For the humidity control container 1, the outermost layer 14 and the intermediate layer 15 are made of high-density polyethylene, the innermost layer 11 is made of low-density polyethylene, the first moisture absorption layer 12 is made of polyethylene mixed with calcium oxide in an amount of 60 wt % and recycled polyethylene resin, and the second moisture absorption layer 13 is made of polyethylene mixed with magnesium sulfate in an amount of 12 wt %. In this configuration, for example, the average thickness of each layer at the trunk 3 is as follows; the innermost layer 11 is about twice as thick as the intermediate layer 15; the outermost layer 14 is about three times the intermediate layer 15; the first moisture absorption layer 12 is about four times the intermediate layer 15; and the second moisture absorption layer 13 is about 10 times the intermediate layer 15.

The bottom 4 has a shape with the center thereof curved inward as illustrated by broken line in FIG. 1. Further, the center of the bottom 4 is provided with a pinch-off portion 5 of an elongated protrusion shape, the pinch-off portion 5 being formed by pinching and crushing the laminated parison by a split mold for blow molding and pinching off the tip thereof. In this example, the pinch-off portion 5 is linearly formed at the center of the bottom 4, but not limited thereto, and may have a curved portion or a bent portion in the extension direction.

Molding of the humidity control container 1 configured in the above described manner is performed, for example, by coextruding resin for each layer from a multilayer extrusion molding die to extrusion mold a laminated parison, which is subjected to blow molding by using a blow molding mold (not illustrated) disposed below the die. For example, the blow molding mold is entirely divided into two by a vertical dividing surface including a central axis of the humidity control container 1. Further, the dividing surface is provided with a pinch-off portion of a mold having a pinch-off blade.

As described above, in the humidity control container 1 according to the present embodiment, the MFR [g/10 min] of the innermost layer 11 is determined as less than 2.0, and thus the pinch-off portion 5 is prevented from being too thin. As a result of this, the strength of the bottom 4 is ensured and bottom crack of the humidity control container 1 can be prevented.

It is to be noted that, in terms of more reliable securement of the strength of the bottom 4, preferably, the MFR of the innermost layer 11 in this example is 0.3 to 1.3. Further, in the same manner, preferably, the MFR of the outermost layer 14 is 0.3 to 0.6, the MFR of the first moisture absorption layer 12 is 0.5 to 1.5, the MFR of the second moisture absorption layer 13 is 0.3 to 0.6 and the MFR of the intermediate layer 15 is 0.3 to 0.6.

Figure 2A:
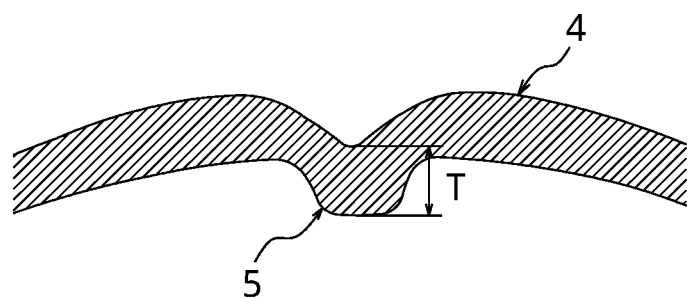
FIG. 2A illustrates a bottom of the humidity control container according to the present disclosure.
Figure 2B:
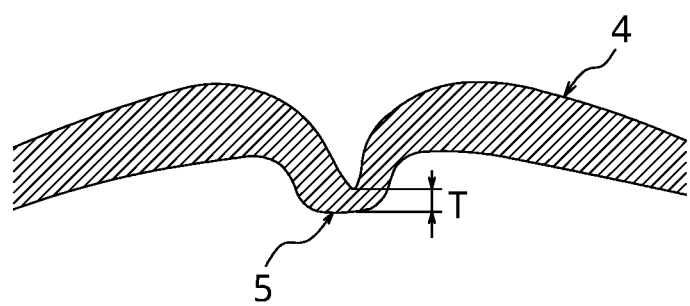
FIG. 2B illustrates a bottom portion of the humidity control container according to the present disclosure.
Figure 2C:
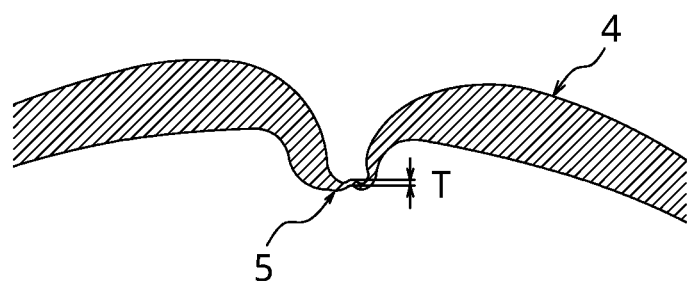
FIG. 2C is a cross-sectional view of a humidity control container illustrated for comparison.

Moreover, preferably, the thickness T of the pinch-off portion 5 illustrated in FIG. 2A-FIG. 2C is 350 μm or more, and with this thickness, the strength of the bottom 4 can be more reliably ensured.

Further, preferably, the innermost layer 11 is made of polyethylene, and with this, the strength of the bottom 4 can be more reliably ensured.

Moreover, preferably, the layer thickness of the innermost layer 11 at the pinch-off portion 5 is 4% or more of the thickness of the wall 10 (in this example, the total thickness of the innermost layer 11, the first moisture absorption layer 12, the second moisture absorption layer 13, the outermost layer 14 and the intermediate layer 15), and with this, the strength of the bottom 4 can be more reliably ensured.

Further, according to this example, the humidity control container 1 has, between the innermost layer 11 and the outermost layer 14, the first moisture absorption layer 12 that contains a hygroscopic inorganic filler (calcium oxide) and the second moisture absorption layer 13 that is disposed outside the first moisture absorption layer 12 and contains a hygroscopic inorganic filler (magnesium sulfate). Thus the moisture in the storing chamber S can be absorbed by the first moisture absorption layer 12 and the moisture of the outside air can be absorbed by the second moisture absorption layer 13, which allows for suppression of quality deterioration of the contents caused by the moisture inside the storing chamber S and difficulty in absorbing the moisture of the outside air by the first moisture absorption layer 12. Thus the first moisture absorption layer 12 can absorb the moisture inside the storing chamber S of the humidity control container 1 in a concentrated manner, and the humidity of the storing chamber S can be easily kept low.

Moreover, in the humidity control container 1 according to this example, the intermediate layer 15 that contains no hygroscopic inorganic filler is disposed between the first moisture absorption layer 12 and the second moisture absorption layer 13, and thus transfer of the moisture absorbed by either one of the first moisture absorption layer 12 and the second moisture absorption layer 13 to the other one can be prevented by the intermediate layer 15. As a result of this, absorption of moisture of the outside air by the second moisture absorption layer 13 and absorption of moisture in the storing chamber S by the first moisture absorption layer 12 can be more reliably realized.

Further, the innermost layer 11, the first moisture absorption layer 12, the intermediate layer 15, the second moisture absorption layer 13 and the outermost layer 14 are made of olefin resin, thus firm joining of each of these layers can be realized easily and reliably.

It is to be noted that the technical scope of the present disclosure is not limited to the above described embodiment, and various modifications are possible without departing from the scope of the invention. For example, in the above described embodiment, three layers of the first moisture absorption layer 12, the second moisture absorption layer 13 and the intermediate layer 15 are disposed between the innermost layer 11 and the outermost layer 14, but not limited thereto, and only one layer or two or more than four layers may be provided between the innermost layer 11 and the outermost layer 14 as far as at least one layer containing a hygroscopic inorganic filler is included. It is to be noted that the material, the thickness and the density of each layer forming the wall 10 can be appropriately changed.

EXAMPLES

Examples of the present disclosure will be described below. Humidity control containers of Examples 1 to 5 according to the present disclosure and humidity control containers of Comparative Examples 1 to 3 in which only configuration of the innermost layer is different were formed and they were examined to confirm the effects of the present disclosure. The humidity control containers according to Examples and Comparative Examples had a weight of about 14 g and a volume of the storing chamber of 100 ml in the shape illustrated in FIG. 1, the storing chamber being able to contain pills such as supplements as contents. Materials and MFRs of the first moisture absorption layer, the second moisture absorption layer, the outermost layer and the intermediate layer of Examples and Comparative Examples are as illustrated in Table 1.

TABLE 1

|  | Material | MFR (g/10 min) |
| --- | --- | --- |
| Outermost layer | HDPE | 0.36 |
| Second moisture absorption layer | PE + MgSO4 (12%) + Recycled material | 0.52 |
| Intermediate layer | HDPE | 0.36 |
| First moisture absorption layer | PE + CaO(60%) | 1.00 |

Table 2 illustrates materials and MFRs (g/10 min) of the innermost layer according to Examples and Comparative Examples. The humidity control containers according to Examples 1 to 5 and Comparative Examples 1 to 3 having an innermost layer with materials and MFRs different from each other were blow molded, and the thickness of the pinch-off portion and the strength of the bottom were measured. Table 2 illustrates a result of the measurement. It is to be noted that the strength of the bottom was evaluated by using Autograph (AG-2000D from Shimazu Corporation). In the evaluation, the pinch-off portion was pushed by using a jig with a round tip at a descending rate of 300 (mm/min), and when a bottom crack occurred at 160 N or more, it was evaluated as "acceptable (A)," and when it was occurred at less than 160 N, it was evaluated as "not acceptable (NA)." Further, FIG. 2A illustrates a bottom cross section of Example 1, FIG. 2B illustrates a bottom cross section of Example 5 and FIG. 2C illustrates a bottom cross section of Comparative example 2.

TABLE 2

|  | Example 1 | Example 2 | Example 3 | Example 4 | Example 5 | Comparative Example 1 | Comparative Example 2 | Comparative Example 3 |
| --- | --- | --- | --- | --- | --- | --- | --- | --- |
| Material for innermost layer |  | HDPE |  | MDPE |  |  | LDPE |  |
| MFR (g/10 min) | 0.36 | 0.55 | 0.36 | 0.45 | 1.30 | 2.00 | 2.40 | 5.00 |
| Bottom strength | A | A | A | A | A | NA | NA | NA |

As illustrated in Table 2, in Examples 1 to 5, the pinch-off portions are thicker than those of Comparative Examples 1 to 3, and the strength of the bottom is high.

REFERENCE SIGNS LIST

1 Humidity control container
2 Mouth
2a Male thread
3 Trunk
4 Bottom
5 Pinch-off portion
10 Wall
11 Innermost layer
12 First moisture absorption layer
13 Second moisture absorption layer
14 Outermost layer
15 Intermediate layer
S Storing chamber
T Thickness of pinch-off portion

The invention claimed is:

1. A synthetic resin humidity control container comprising a storing chamber that contains contents and a pinch-off portion on a bottom, a wall of the humidity control container including:
   an innermost layer that defines the storing chamber;
   an outermost layer that is disposed outside the innermost layer; and
   a moisture absorption layer that is disposed between the innermost layer and the outermost layer and contains a hygroscopic inorganic filler; wherein
   the innermost layer is made of a material having an MFR of less than 2.0,
   a thickness of the innermost layer is smaller than a thickness of the outermost layer and a thickness of the moisture absorption layer,
   the thickness of the innermost layer of the pinch-off portion is 4% or more of a thickness of the wall,
   the moisture absorption layer includes a first moisture absorption layer that contains calcium oxide and a second moisture absorption layer that is disposed outside the first moisture absorption layer and contains magnesium sulfate,
   an intermediate layer that contains no hygroscopic inorganic filler is disposed between the first moisture absorption layer and the second moisture absorption layer, and
   the MFR of the innermost layer is 0.3 to 1.3, the MFR of the outermost layer is 0.3 to 0.6, the MFR of the first moisture absorption layer is 0.5 to 1.5, the MFR of the second moisture absorption layer is 0.3 to 0.6 and the MFR of the intermediate layer is 0.3 to 0.6.

2. The synthetic resin humidity control container according to claim 1, wherein the pinch-off portion has a thickness of 350 μm or more.

3. The synthetic resin humidity control container according to claim 1, wherein the innermost layer is made of polyethylene.

4. The synthetic resin humidity control container according to claim 2, wherein the innermost layer is made of polyethylene.

* * * * *